United States Patent [19]
Tipton

[11] Patent Number: 5,782,194
[45] Date of Patent: Jul. 21, 1998

[54] METHOD OF DISSIMILAR METAL ATTACHMENT TO SHIP HULLS

[75] Inventor: David G. Tipton, Severna Park, Md.

[73] Assignee: Northrop Grumman Corporation, Los Angeles, Calif.

[21] Appl. No.: 745,983

[22] Filed: Nov. 8, 1996

[51] Int. Cl.$^6$ ........................................... B63B 3/00
[52] U.S. Cl. ..................... 114/79 W; 411/171; 228/262.1
[58] Field of Search .................. 114/79 W; 411/171, 411/378; 228/262.1, 262.4, 262, 41, 262.2

[56] References Cited

U.S. PATENT DOCUMENTS 4,214,332  7/1980  Stoner .................................. 114/79 W
4,684,304  8/1987  Franks ................................. 114/79 W Primary Examiner—Jesus D. Sotelo
Attorney, Agent, or Firm—Walter G. Sutcliff

[57] ABSTRACT

A bimetallic hull mount assembly (10) for reducing galvanic corrosion of a hull (12), including a foundation (14), made of a first material, welded to the hull (12), also made of the first material; and an insert (16), made of a second material, different from the first material, welded to the foundation (14); wherein a weld area (15) between the insert (16) and the foundation (14) is covered with paint (19), and where the insert (16) is welded to the foundation (14) in a controlled welding manufacturing environment, utilizing high performance dissimilar welding techniques to produce a dissimilar metal weld and the foundation (14) is welded to the hull (12) with a standard shipyard weld.

20 Claims, 1 Drawing Sheet

METHOD OF DISSIMILAR METAL ATTACHMENT TO SHIP HULLS

This invention relates generally to a mechanical and material design of making dissimilar metal mechanical attachments. In particular, the present invention is directed to a method of dissimilar metal attachments for ship hulls and a bimetallic hull mount assembly for reducing galvanic corrosion of a ship's hull.

Currently, the attachment of sonar and other equipment to submarine ship hulls involves the use of bimetallic Inconel™ 625/HY80 steel studs, welded to the submarine ship hull by electrical resistance methods. The primary quality control procedure for this type of stud welding is pull testing, which confirms that the weld has adequate initial mechanical strength, however, because of the relatively small size and irregular profile of the weld, resistance to water penetration cannot be evaluated in a shipyard welding environment.

In a particular system installation, namely the installation of AN/BQG-5 wide aperture array external sonar equipment on a combat submarine ship, resulted in severe corrosion of the submarine ship hull, using the above-identified bimetallic Inconel™ 625/HY80 steel studs. This severe corrosion presents a risk to the structural integrity of the submarine ship hull and as a result, jeopardizes the submarine ship crew, after long-term exposure to sea water, during fleet evaluation and routine operation.

The present invention is a method and apparatus for providing the required mechanical attachment, while greatly reducing the risk of corrosion damage and structural risk to a submarine hull, made of HY80 steel, for example.

The present invention solves the above-identified problems with current state of the art welding techniques by utilizing bimetallic Inconel™/steel assembly, welded to the submarine hull, wherein the critical weld is made in a dedicated manufacturing environment. This high performance assembly and novel welds minimize galvanic corrosion, which plagues current state of the art techniques.

SUMMARY OF THE INVENTION

One object of the present invention is to provide a bimetallic hull mount assembly, which includes two parts, one of which is made of the same material as a ship hull to which the hull mount assembly is to be mounted.

Another object of the present invention is to provide a hull mount assembly, wherein the two different compositions of the hull mount assembly are welded together in a controlled welding manufacturing environment, whereas the hull mount assembly itself is mounted to the ship's hull in a standard shipyard procedure.

Another object of the present invention is to provide a hull mounted assembly which reduces galvanic corrosion of a ship hull to which the hull mount assembly is mounted.

These objects are achieved by providing a bimetallic hull mount assembly for reducing galvanic corrosion of a hull, comprising a foundation, made of a first material, welded to the hull, also made of the first material and an insert, made of a second material, different from the first material, welded to said foundation, wherein a weld area between said insert and said foundation is covered with paint.

These objects are also achieved by providing a method of dissimilar metal attachment to reduce galvanic erosion of a hull comprising the steps of a) welding a foundation to the hull, wherein both the foundation and the hull are made of a first material; b) welding an insert to the foundation, wherein the insert is made of a second material, different from the first material; and c) covering a weld area between the insert of the foundation with paints.

These and other objects of the present invention will become more readily apparent from the detailed description given hereafter. However, it should be understood that the detailed description of the specific examples, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only and thus do not limit the present invention, wherein.

Further scope of applicability of the present invention will become apparent from the detailed description given hereafter. However, it should be understood that the detailed description and specific examples, while indicating preferred embodiments of the invention are given by way of illustration only, since various changes and modifications within the spirit and scope of the invention will become apparent to those skilled in the art from this detailed description.

DETAILED DESCRIPTION OF THE PREFERRED EMBODIMENT

The present invention is directed to a bi-metallic hull mount assembly and a method of dissimilar metal attachment to reduce galvanic corrosion, which permits same-metal welding to an HY80 steel ship hull and noble, non-corrodible threads, made of a corrosion resistant alloy for stud or bolt attachment. The corrosion resistant alloy, in a preferred embodiment, is a nickel-chromium alloy. In a more preferred embodiment, the corrosion resistant allow is Inconel™ and in a more preferred embodiment, the corrosion resistant alloy is Inconel™ 625. A threaded Inconel™ 625 insert is fabricated with a threaded blind hole to prevent sea water intrusion. Prior to shipyard installation, this insert is welded to a steel foundation using high performance dissimilar welding techniques in a controlled welding manufacturing environment.

A welded, sea water leak-type design and a paintable dissimilar metal interface minimize any risk of galvanic corrosion of the ship hull. A steel foundation from the same alloy as the ship hull, HY80 steel, is used to provide a similar alloy for the field welding attachment to the ship hull. After welding to the ship hull, the steel-to-steel weld is contoured to facilitate paint adhesion. Paint is applied to cover the existing hull paint, the steel foundation, and the Inconel™ 625-to-HY80 steel dissimilar weld. After painting, there is only a very small area of the nobel Inconel™ 625 exposed to the sea water environment. This minimizes the tendency for galvanic accelerated corrosion of the steel. The complete hull mount can accept studs or bolts to attach equipment to the ship hull. The use of anodized titanium fasteners in accordance with AMS 2488B, Type 2 and solid dry film lubricant coated titanium fasteners in accordance with MIL-L-46010, Type 2 allow the minimization of galvanic corrosion of the steel, while using noble, corrosion immune fasteners.

Figure 1:
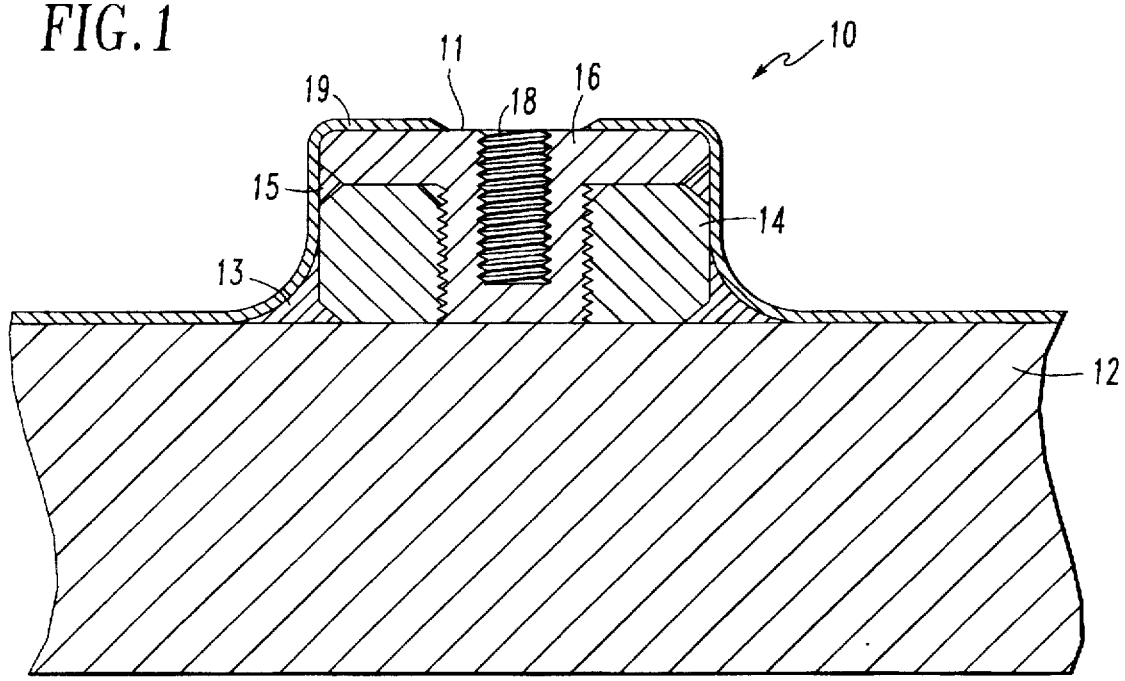
FIG. 1 illustrates a first embodiment of the present invention with one foundation and one insert.
Figure 2:
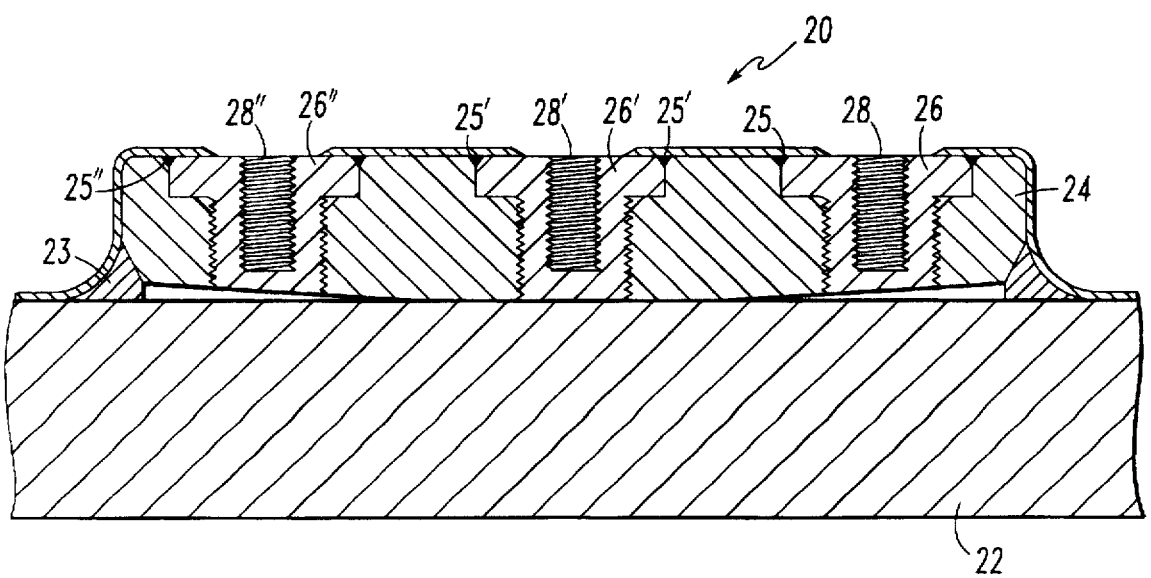
FIG. 2 illustrates a second embodiment of the present invention with one foundation and multiple inserts.

The present invention, in one embodiment, is illustrated in FIG. 1. The bimetallic hull mount assembly 10 of FIG. 1 is mounted to a hull 12, such as a submarine hull. In a preferred embodiment, the hull 12 is made of HY80 steel. The bimetallic hull mount assembly 10 includes a foundation 14 and an insert 16. In a preferred embodiment of the present invention, the foundation 14 is also made of HY80 steel and the insert 16 is made of Inconel™ 625. The insert 16 further includes a threaded hole 18 for accepting a stud or bolt (not shown). The insert 16 is welded to the foundation 14 in a controlled welding manufacturing environment, utilizing known high performance dissimilar welding techniques to produce dissimilar metal weld 15. These known high performance dissimilar welding techniques are usually performed in a controlled environment, where temperature and humidity are closely controlled. These known high performance dissimilar welding techniques also may be performed in the presence of an inert gas.

Then, the bimetallic hull mount assembly 10 including the foundation 14 and the insert 16 is taken to a shipyard, where a standard shipyard weld 13 is performed in order to attach the bimetallic hull mount assembly 10 to the hull 12. Standard shipyard welds are usually performed on-site, in the shipyard, and are subject to temperature and humidity fluctuations, typical of such an environment. Subsequently, the ship's hull 12 and the bimetallic hull mount assembly 10 are painted with paint 19, in order to cover the dissimilar metal weld, leaving only a very small exposed area 11 of the insert 16.

In another preferred embodiment, the present invention includes a bimetallic hull mount assembly 20, wherein a single HY80 steel foundation 24 has several threaded and welded noble metal inserts 26, 26', 26", including threaded holes 28, 28', 28", for fastener attachment to hull 22. The inserts 26, 26', 26" are welded to the foundation 24 at dissimilar metal welds 25, 25', 25" and the foundation 24 is welded to the hull 22 at same-metal weld 23. This variant allows for improved positional tolerancing since relative positions of the multiple threaded inserts 26, 26', 26" can be established during manufacturing by numerically controlled equipment. Field installation in the shipyard is then simplified by a single positional requirement for the foundation 24.

The present invention has the following advantages. First, the foundation, made of the same material as the hull, provides an interface between the ship hull and the threaded insert. This allows a similar metal weld to be performed on the ship hull, and separates the noble metal, namely the threaded insert, from the ship hull. Further, the nobel metal Inconel™ 625 insert includes a threaded interface to bolts or fasteners and the Inconel™ 625 insert includes corrosion-immune threads. The threaded Inconel™ 625 insert permits the temporary installation of equipment, such as sonar equipment, to ship hulls, without subjecting the ship hull to the possibility of galvanic corrosion. The threaded Inconel™ 625 insert also permits the installation of composite fairings to a steel submersible hull. The paint covers the similar metal interface between the foundation and the insert 16 in order to prevent galvanic corrosion of the ship hull. Additionally, the studs or bolts may be made of beta-C titanium in order to attach sonar equipment to the threaded hole of the insert. These beta-C titanium studs or bolts are lightweight, corrosion immune, and do not cause any galvanic corrosion when coated with an anodizing agent.

The invention being thus described, it will obvious that the same may be varied in many ways. Such variations are not to be regarded as a departure from the spirit and scope of the invention, and all such modifications as would be obvious to one skilled in the art are intended to be included within the scope of the following claims.

In the claims:

1. A bimetallic hull mount assembly for reducing galvanic corrosion of a hull, comprising:
   a foundation, made of a first material, welded to the hull, also made of the first material; and
   an insert, made of a second material, different from the first material, welded to said foundation;
   wherein a weld area between said insert and said foundation is covered with paint.

2. The bimetallic hull mount assembly of claim 1, wherein said insert is welded to said foundation in a controlled welding manufacturing environment.

3. The bimetallic hull mount assembly of claim 1,
   wherein the first material is steel and the second material is a nickel-chromium alloy.

4. The bimetallic hull mount assembly of claim 3, wherein a weld area between said bimetallic hull mount assembly and the hull is contoured and covered with paint.

5. The bimetallic hull mount assembly of claim 3, wherein substantially all of an exposed surface of said insert is covered with paint.

6. The bimetallic hull mount assembly of claim 3, wherein said foundation and said insert are welded together using dissimilar welding techniques in a controlled welding manufacturing environment.

7. The bimetallic hull mount assembly of claim 1, said insert including noble, non-corrodible threads for receiving studs or bolts.

8. The bimetallic hull mount assembly of claim 7, said insert further including a threaded blind hole to prevent sea water intrusion.

9. The bimetallic hull mount assembly of claim 4, wherein the studs or bolts are anodized and solid dry film lubricant coated titanium fasteners.

10. The bimetallic hull mount assembly of claim 1, further comprising additional inserts also made of the second material, welded to said foundation at different positions on said foundation to provide a plurality of sites at which to attach external equipment to the hull.

11. A method of dissimilar metal attachment to reduce galvanic erosion of a hull comprising the steps of:
   a) welding a foundation to the hull, wherein both the foundation and the hull are made of a first material;
   b) welding an insert to the foundation, wherein the insert is made of a second material, different from the first material;
   c) covering a weld area between the insert and the foundation with paints.

12. The method of claim 11, wherein said step b) is performed in a controlled welding manufacturing environment.

13. The method of claim 11, wherein the first material is steel and the second material is a nickel-chromium alloy.

14. The method of claim 13, wherein a weld area between said foundation and the hull is contoured and covered with paint.

15. The method of claim 13, wherein substantially all of an exposed surface of said insert is covered with paint.

16. The method of claim 13, said insert further including a threaded blind hole to prevent sea water intrusion.

17. The method of claim 13, wherein said foundation and said insert are welded together using dissimilar welding techniques in a controlled welding manufacturing environment.

18. The method of claim 13, wherein the studs or bolts are anodized and solid dry film lubricant coated titanium fasteners.

19. The method of claim 11, said insert including noble, non-corrodible threads for receiving studs or bolts.

20. The method of claim 11, further comprising the step of:

d) welding additional inserts also made of the second material, to the foundation at different positions on the foundation to provide a plurality of sites at which to attach external equipment to the hull.

* * * * *